United States Patent [19]

Arutjunian et al.

[11] Patent Number: 4,713,155

[45] Date of Patent: Dec. 15, 1987

[54] METHOD FOR PREPARATION OF PHOSPHATIDE CONCENTRATES FROM VEGETABLE OILS

[75] Inventors: Norair S. Arutjunian; Elena P. Kornena; Robert V. Kazarian; Natalya A. Ponomareva; Grigory V. Redko; Lidia T. Sakhno; Irina S. Zhidkova, all of Krasnodar, U.S.S.R.

[73] Assignee: Krasnodarsky Politekhnichesky Institut, Krasnodar, U.S.S.R.

[21] Appl. No.: 884,038

[22] Filed: Jul. 10, 1986

[51] Int. Cl.$^4$ .............................................. C25F 1/00
[52] U.S. Cl. .................................................. 204/155
[58] Field of Search ........................................ 204/155

[56] References Cited

U.S. PATENT DOCUMENTS 3,880,734  4/1975  Bach ................................. 204/155
4,448,657  5/1984  Turro ................................ 204/155

*Primary Examiner*—R. L. Andrews
*Attorney, Agent, or Firm*—Ladas & Parry

[57] ABSTRACT

A method for preparation of phosphatide concentrates from vegetable oil comprising the treatment of crude vegetable oil with water or aqueous solution of electrolyte, separation of the sediment of phospholipids from hydrated vegetable oil, treating said sediment in an electromagnetic field, strength 40 000–240 000 A/m at 50°–65° C., and drying said sediment.

9 Claims, No Drawings

METHOD FOR PREPARATION OF PHOSPHATIDE CONCENTRATES FROM VEGETABLE OILS

FIELD OF APPLICATION

The present invention relates to oil-and-fat branch of the food industry and more particularly it relates to the methods for preparation of phosphatide concentrates (lecithin) from vegetable oils.

Phosphatide concentrates are a valuable product extensively utilized in confectionery, baking, fat-and-oil and other branches of food industry.

BACKGROUND OF THE INVENTION

Known in the prior art is a method for preparation of phosphatide concentrates comprising the treatment of crude vegetable oil with water of aqueous solution of electrolyte, separation of the sediment of phospholipides from hydrated vegetable oil by settling or centrifuging and drying said sediment at 60°-90° C. ("Production and Processing of Vegetable Oils and Fats. Handbook" Leningrad, VNIIZH, 1973, vol 2, pp 13–44; "Production Technology of Vegetable Oils" ed. V. M. Kopeysky and S. I. Danilchuk, Moscow, "Light and Food Industry" Publishers, 1982, pp 404–407).

However, this method is noted for the following disadvantages.

The process of drying at 60°-90° C. fails to ensure maximum removal of moisture from phosphatide concentrate and, consequently, does not produce phosphatide concentrate with a low moisture content. Moisture in phosphatide concentrate raises the acid number of oil separated from phosphatide concentrate and the colur of said concentrate, i.e. it impairs the quality of phosphatide concentrates. Besides, in order to remove the maximum amount of moisture from phosphatide concentrate the drying temperature of phospholipid sediment should be raised to 100° C. which also affects detrimentally the quality of phosphatide concentrates due to the formation of undesirable products, melanophospholipids, which increase the colour index of phosphatide concentrate, and due to an increase in the acid number of the oil separated from phosphatide concentrate.

BRIEF DESCRIPTION OF THE INVENTION

An object of the present invention is to provide a method of preparation of phosphatide concentrate from vegetable oils which, without increasing the phospholipid sediment drying temperature, would produce phocphatide concentrates with a minimum moisture content, minimum acid number of the oil separated from phosphatide concentrate, and a minimum colour index of phosphatide concentrate.

In accordance with this and other objects, the invention consists in that a method is proposed for preparation of phosphatide concentrates from vegetable oils comprising the treatment of crude vegetable oil with water or aqueous solution of electrolyte, separation of the phospholipid sediment from hydrated vegetable oil and drying said sediment in which, according to the invention, the sediment of phospholipides is treated before drying in electromagnetic field of 40 000–240 000 A/m strength at 50°-65° C.

The sediment of phospholipids may be treated either in a constant or variable electromagnetic field or in the field rotating at a speed of 500–3000 rpm.

The disclosed method for preparation of phosphatide concentrates from vegetable oils provides for:
  improving the quality of phosphatide concentrates by reducing their moisture content, colour index and the acid number of the oil separated from phosphatide concentrate;
  reduced the power cnsumption for drying the phospholipid sediment by drying said sediment at low temperatures.

As stated above, the sediment of phospholipides is treated before drying at 50°-65° C. in an electromagnetic field of 40 000–240 000 A/m.

The temperature of treating the sediment of phospholipids below 50° C. is not recommended, since these temperatures fail to yield positive effect.

Conversely, temperatures above 65° C. for treating the sediment of phospholipids are impracticable since they do not ensure any additional positive effect but involve extra power consumption.

The use of electromagnetic field with a strength below 40 000 A/m should be discouraged since these parameters deny the achievement of a positive effect.

The electromagnetic field with a strength above 240 000 A/m is impracticable for treating the sediment of phospholipides since the accomplishment of the method at these parameters fails to provide an additional positive effect and involves extra power consumption.

It is not recommended that the sediment of phospholipids be treated in the electromagnetic field rotating at speeds lower than 500 rpm since these parameters do not produce positive effect.

It is likewise inexpedient to treat the sediment of phospholipids in the electromagnetic field rotating at speeds higher than 3 000 rpm, since these parameters do not produce any additional positive effect but involve extra power consumption.

DETAILED DESCRIPTION OF THE INVENTION

The disclosed method for preparation of phosphatide concentrates from vegetable oils is accomplished as follows.

Crude vegetable oil, e.g. sunflower or soya oil, is treated at 20°-70° C. with a hydrating agent, e.g. water or aqueous solution of electrolyte, for example 0.3% aqueous solution of sodium chloride, or 0.1% aqueous solution of citric acid. The amount of hydrating agent should be 1-3% of the mass of crude vegetable oil. The sediment of phospholipides is separated from the hydrated vegetable oil by settling or centrifuging. The separated sediment of phospholipids is treated at 50°-65° C. in electromagnetic field of 40 000–240 000 A/m and dried at 50°-70° C. The sediment is treated in a constant or variable electromagnetic field or in the field rotating at a speed of 500–3 000 rpm.

The quality of phosphatide concentrates is assessed by the following indices: moisture content, colour index, acid number of the oil separated from phosphatide concentrate.

These indices are determined by the known methods described in "Practical Laboratory Training in Processing Fats" ed. N. S. Arutunian, Moscow, "Light and Food Industry" Publ. House, 1983, pp 32–36.

The present invention will become more fulls apparent from the following examples of its realization.

EXAMPLE 1

Crude sunflower oil, acid number 2.48 KOH and phospholipid content 0.58%, is treated at 20° C. with water in the amount of 2% of the mass of oil. The sediment of phospholipids is separated from the hydrated vegetable oil by settling. The separated sediment of phospholipids is treated at 50° C. in a constant electromagnetic field of 40 000 A/m and dried at 70° C.

EXAMPLE 2

Crude sunflower oil, acid number 2.48 mg KOH, phospholipid content 0.58%, is treated at 50° C. with 0.3% aqueous solution of sodium chloride taken in the amount of 1.5% of the mass of oil. The sediment of phospholipides is separated from the hydrated vegetable oil by centrifuging, treated at 65° C. in a constant electromagnetic field, intensity 240 000 A/m, and dried at 65° C.

EXAMPLE 3

Crude sunflower oil, acid number 3.08 mg KOH, phospholipid content 0.65%, is treated at 70° C. with water in the amount of 1.0% of the mass of oil. The sediment of phospholipids is separated from hydrated vegetable oil by settling, then treated at 60° C. in a constant electromagnetic field, intensity 160 000 A/m, and dried at 60° C.

EXAMPLE 4

Crude soya oil, acid number 1.92 mg KOH, phospholipid content 2.15%, is treated at 20° C. with 0.1% aqueous solution of citric acid in the amount of 1.5% of the mass of oil. The sediment of phospholipids is separated from hydrated vegetable oil by centrifuging and treated at 65° C. in a variable electromagnetic field, intensity 40 000 A/m, then dried at 65° C.

EXAMPLE 5

Crude soya oil, acid number 1.92 mg KOH, phospholipid content 2.15%, is treated at 70° C. with 0.5% aqueous solution of sodium chloride in the amount of 2.5% of the mass of oil. The sediment of phospholipids is separated from hydrated vegetable oil by settling and treated at 50° C. in a variable electromagnetic field, intensity 240 000 A/m, then dried at 50° C.

EXAMPLE 6

Crude soya oil, acid number 2.45 mg KOH, phospholipid content 1.58% is treated at 70° C. with 1% aqueous solution of citric acid in the amount of 1% of the mass of oil. The sediment of phospholipids is separated from hydrated vegetable oil by centrifuging and treated at 55° C. in a variable electromagnetic field of 160 000 A/m at 65° C.

EXAMPLE 7

Crude sunflower oil, acid number 3.40 mg KOH, phospholipid content 0.85% is treated at 65° C. with water in the amount of 1.0% of the mass of oil. The sediment of phospholipids is separated from hydrated vegetable oil by settling and treated at 50° C. in an electromagnetic field, strength 40 000 A/m, rotating at a speed of 3000 rpm, then dried at 60° C.

EXAMPLE 8

Crude soya oil, acid number 3.50 mg KOH, phospholipid content 2.75%, is treated at 60° C. with 0.1% aqueous solution of citric acid in the amount of 3.0% of the mass of oil. The sediment of phospholipids is separated from hydrated vegetable oil by settling and treated at 65° C. in a rotating electromagnetic field, strength 240 000 A/m, rotating speed 500 rpm, then dried at 70° C.

EXAMPLE 9

Crude soya oil, acid number 2.50 mg KOH, phospholipid content 2.75%, is treated at 65° C. with 1% aqueous solution of sodium chloride in the amount of 2.5% of the mass of oil. The sediment of phospholipids is separated from hydrated vegetable oil by centrifuging and treated at 50° C. in an electromagnetic field, strength 160 000 A/m, rotating at a speed of 1500 rpm, then dried at 65° C.

EXAMPLE 10 (comparative)

The method is accomplished under the conditions described in "Production and Processing of Vegetable Oils and Fats". Handbook., Leningrad, VNIIZH, 1973, pp 13–44.

Crude sunflower oil, acid number 2.48 mg KOH, phospholipid content 0.58%, is treated at 70° C. with water taken in the amount of 2.0% of the mass of oil. The sediment of phospholipids is separated from hydrated vegetable oil by settling and dried at 70° C.

EXAMPLE 11 (comparative)

The method is accomplished under the conditions described in "Production and Processing of Vegetable Oils and Fats". Handbook. Leningrad, VNIIZH 1973, pp 13–44.

Crude soya oil, acid number 1.92 mg KOH, phospholipid content 2.15% is treated at 50° C. with 0.5% aqueous solution of sodium chloride taken in the amount of 3.0% of the mass of oil. The sediment of phospholipids is separated from hydrated vegetable oil by centrifuging and dried at 80° C.

The data collected by accomplishing the method under the conditions stated in Examples 1 through 11 are summarized in the Table.

TABLE

| | Quality characteristics of phosphatide concentrate | | |
|---|---|---|---|
| Example No. | Colour index, mg iodine | Moisture content % | Acid number, mg KOH of oil separated from phosphatide concentrate |
| 1 | 2 | 3 | 4 |
| 1 | 12.0 | 0.58 | 10.57 |
| 2 | 10.0 | 0.50 | 10.05 |
| 3 | 11.0 | 0.45 | 11.59 |
| 4 | 9.0 | 0.70 | 10.48 |
| 5 | 8.0 | 0.60 | 9.85 |
| 6 | 8.5 | 0.59 | 10.17 |
| 7 | 11.5 | 0.65 | 12.00 |
| 8 | 11.0 | 0.40 | 9.85 |
| 9 | 10.5 | 0.45 | 10.52 |
| 10 (comparative) | 15.5 | 0.98 | 14.87 |
| 11 (comparative) | 15.5 | 0.98 | 15.49 |

The results contained in the Table point to the fact that phosphatide concentrates produced in accordance with the disclosed method (Examples 1 through 9) feature a higher quality than do the phosphatide concentrates produced by the prior art method (Examples 10 and 11). Thus, the moisture content of phosphatide concentrates, the acid number of oil separated from phosphatide concentrate and the colour index of phosphatide concentrates produced in Examples 1 through 9 are lower than the respective indices in phosphatide concentrates produced in Examples 10 and 11.

Apart from that, the disclosed method permits lowering the drying temperature of phospholipide sediment (Examples 5 and 7) which, in turn, curtails the power consumption for the process of drying.

What is claimed is:

1. A method for preparation of phosphatide concentrates from vegetable oils comprising treating crude vegetable oil with a hydrating agent selected from the group consisting of water and aqueous solutions of electrolytes, separating phospholipids from hydrated vegetable oil providing a phospholipid sediment, passing said sediment through an electromagnetic field with a strength of 40 000–24 000 Amperes/meter at 5°–65° C., and drying the treated phospholipid sediment.

2. The method according to claim 1 wherein the electromagnetic field is a constant electromagnetic field.

3. The method according to claim 1 wherein the electromagnetic field is a variable electromagnetic field.

4. The method according to claim 1 wherein the electromagnetic field is a rotating electromagnetic field rotating at a speed of 500–3 000 rpm.

5. The method according to claim 1 wherein the crude vegetable oil comprises sunflower oil.

6. The method according to claim 1 wherein the crude vegetable oil comprises soya oil.

7. The method according to claim 1 wherein the vegetable oil is treated with the hydrating agent at a temperature of 20°–70° C.

8. The method according to claim 1 wherein said hydrating agent comprises citric acid.

9. The method according to claim 1 wherein said hydrating agent comprises water in an amount of 1.0% by mass of vegetable oil.

* * * * *